United States Patent
Liu et al.

(10) Patent No.: US 7,067,586 B2
(45) Date of Patent: Jun. 27, 2006

(54) METHODS OF MAKING ABA-TYPE BLOCK COPOLYMERS HAVING A RANDOM BLOCK OF HYDROPHOBIC AND HYDROPHILIC MONOMERS

(75) Inventors: Mingjun Liu, Santa Clara, CA (US); Damian Hajduk, San Jose, CA (US); Jean M. J. Frechet, Oakland, CA (US); Ezat Khoshdel, Neston (GB); Ralph B. Nielsen, San Jose, CA (US); Dominique Charmot, Campbell, CA (US)

(73) Assignee: Symyx Technologies, Inc., Santa Clara, CA (US)

(*) Notice: Subject to any disclaimer, the term of this patent is extended or adjusted under 35 U.S.C. 154(b) by 0 days.

(21) Appl. No.: 10/881,421

(22) Filed: Jun. 29, 2004

(65) Prior Publication Data

US 2004/0242789 A1 Dec. 2, 2004

Related U.S. Application Data

(62) Division of application No. 09/679,127, filed on Oct. 3, 2000, now Pat. No. 6,767,968.

(51) Int. Cl.
*C08F 265/00* (2006.01)
*C08F 271/00* (2006.01)

(52) U.S. Cl. .............. 525/242; 525/280; 525/281; 525/282; 525/294; 525/296; 525/299; 525/301; 525/309; 525/302; 525/303; 525/304

(58) Field of Classification Search ........... 525/242, 525/280, 281, 282, 294, 296, 299, 301, 309, 525/302, 303, 304
See application file for complete search history.

(56) References Cited

U.S. PATENT DOCUMENTS

| | | | |
|---|---|---|---|
| 4,260,659 A | 4/1981 | Gobran | 428/217 |
| 4,361,526 A | 11/1982 | Allen | 264/3 C |
| 4,483,978 A | 11/1984 | Manser | 528/408 |
| 4,551,388 A | 11/1985 | Schlademan | 428/355 |
| 4,554,324 A | 11/1985 | Husman et al. | 525/301 |
| 4,656,213 A | 4/1987 | Schlademan | 524/272 |
| 4,764,586 A | 8/1988 | Manser et al. | 528/362 |
| 4,778,852 A | 10/1988 | Futamura | 525/97 |
| 4,806,613 A | 2/1989 | Wardle | 528/59 |
| 4,919,737 A | 4/1990 | Biddle et al. | 149/19.5 |
| 4,952,644 A | 8/1990 | Wardle et al. | 525/410 |
| 4,976,794 A | 12/1990 | Biddle et al. | 149/19.5 |
| 5,700,892 A | 12/1997 | Takiguchi et al. | 526/306 |
| 5,756,585 A | 5/1998 | Teyssie et al. | 525/299 |
| 5,807,937 A | 9/1998 | Matyjaszweski et al. | 526/135 |
| 5,980,878 A | 11/1999 | Torgerson et al. | 424/70.122 |
| 6,111,022 A | 8/2000 | Matyjaszewski et al. | 525/238 |
| 6,150,468 A | 11/2000 | Schoenberg et al. | 525/222 |
| 6,201,099 B1 | 3/2001 | Petersen et al. | 528/376 |
| 6,380,335 B1 * | 4/2002 | Charmot et al. | 526/220 |
| 6,518,364 B1 * | 2/2003 | Charmot et al. | 525/259 |
| 6,569,969 B1 * | 5/2003 | Charmot et al. | 526/220 |
| 6,844,407 B1 * | 1/2005 | Charmot et al. | 526/219 |
| 2002/0013430 A1 | 1/2002 | Klaerner et al. | 526/75 |

FOREIGN PATENT DOCUMENTS

| | | |
|---|---|---|
| EP | 0 320 218 A2 | 6/1989 |
| EP | 0 459 588 | 5/1991 |
| EP | 0 728 778 A1 | 8/1996 |
| EP | 0 887 362 | 12/1998 |
| EP | 1 043 346 A1 | 10/2000 |
| GB | 1 425 228 | 2/1976 |
| GB | 1 512 280 | 5/1978 |
| WO | WO 98/01478 | 1/1998 |
| WO | WO 98/58974 | 12/1998 |
| WO | WO 99/05184 | 2/1999 |
| WO | WO 99/31144 | 6/1999 |
| WO | WO 99/35177 | 7/1999 |
| WO | WO 00/24795 | 5/2000 |
| WO | WO 00/53640 | 9/2000 |
| WO | WO 00/68275 | 11/2000 |
| WO | WO 00/71606 | 11/2000 |
| WO | WO 00/71607 | 11/2000 |
| WO | WO 01/89470 | 11/2001 |

OTHER PUBLICATIONS

Benoit et al., "Development of a Universal Alkoxyamine for 'Living' Free Radical Polymerizations", *J. Am. Chem. Soc.*, 121(16), 1999, 3904-3920.

(Continued)

*Primary Examiner*—Jeffrey Mullis

(57) ABSTRACT

Block copolymers are prepared by living-type or semi-living type free radical polymerization, with said copolymers having at least one random block comprised of at least one hydrophobic monomer and at least one hydrophilic monomer. The selection of hydrophobic and hydrophilic monomers in the random block is determined by the relative hydrophobicity of the monomers to impart selected solubility or dispersability in water and/or alcohols of the overall block copolymer.

16 Claims, 2 Drawing Sheets

OTHER PUBLICATIONS

Burguiere et al., "Amphiphilic Block Copolymers Prepared Via Controlled Radical Polymerization As Surfactants For Emulsion Polymerization", *Macromolecular Symposia, Wiley VCH*, Weinheim, DE, No. 150, Feb. 2000, pp. 39-44.

G. Coulon et al., "Interference Microscopy on Thin Diblock Copolymer Films", *J. Phys. (Paris)*, 51, 777, 1990.

Hansch et al., "Exploring QSAR: Hydrophobic, Electronic, and Steric Constants", *ACS Professional Reference Book*, 1995, (copy of front cover only).

Lambert et al., "Synthesis of Three-Arm Star Block Copolymers", *Macromolecular Symposia, Wiley VCH*, Weinheim, DE, No. 161, Oct. 2000, pp. 97-102.

*Polymer Handbook*, 3$^{rd}$ Edition, John Wiley & Sons, (Inc.), 1989, pp. VII-380, 385, 386, 403, 404.

Russell et al., "Characteristics of the Surface-Induced Orientation for Symmetric Diblock PS/PMMA Copolymers", *Macromolecules*, 22, 1989, 4600-6.

* cited by examiner

METHODS OF MAKING ABA-TYPE BLOCK COPOLYMERS HAVING A RANDOM BLOCK OF HYDROPHOBIC AND HYDROPHILIC MONOMERS

This application is a divisional application of U.S. patent application Ser. No. 09/679,127, filed on Oct. 3, 2000, now issued as U.S. Pat. No. 6,767,968 to Liu et al.

FIELD OF THE INVENTION

The present invention relates to novel block copolymers that include a random block comprised of both hydrophobic and hydrophilic monomers. Polymers of this type are useful for many different applications, including pressure sensitive adhesives as well as personal care products. The polymers are prepared by radical polymerization techniques, which can control the architecture of the polymer.

BACKGROUND OF THE INVENTION

Block copolymers are known as polymers comprising molecules in which there is a linear arrangement of blocks, a block being defined as a portion of a polymer molecule in which the monomeric units have at least one constitutional or configurational feature absent from the adjacent portions. In a block copolymer, the distinguishing feature is constitutional, i.e., each of the blocks comprises units derived from a characteristic species of monomer.

A common type of block copolymer is a thermoplastic elastomer. The thermoplastic elastomers in general use contain (i) polymeric blocks (usually referred to as "hard" blocks or A blocks) which (a) are typically amorphous and have a glass transition temperature, $T_{g,A}$, which is well above room temperature, or (b) have a crystalline polymer backbone and have a crystalline melting point, $T_{m,A}$, which is well above room temperature, and (ii) amorphous polymeric blocks (usually referred to as "soft" blocks or B blocks) which have a glass transition point, $T_{g,B}$, which is well below room temperature. Each soft block is linked to at least two hard blocks, so that at temperatures between $T_{g,B}$ and $T_{m,A}$, or $T_{g,B}$ and $T_{g,A}$, the amorphous B blocks are associated with each other, resulting in elastomeric behavior. Above $T_{m,A}$ or $T_{g,A}$, melting or softening of the hard blocks permits viscous flow of the polymeric chains, resulting in thermoplastic behavior. Known thermoplastic elastomers are described for example in U.S. Pat. No. 4,260,659 (Gobran), U.S. Pat. No. 4,361,526 (Allen), U.S. Pat. No. 4,483,978 (Manser), U.S. Pat. No. 4,551,388 (Schlademan), U.S. Pat. No. 4,554,324 (Husman), U.S. Pat. No. 4,656,213 (Schladman), U.S. Pat. No. 4,764,586 (Manser), U.S. Pat. No. 4,778,852 (Futamura), U.S. Pat. No. 4,806,613 (Wardle), U.S. Pat. No. 4,919,737 (Biddle et al), U.S. Pat. No. 4,952,644 (Wardle et al), and U.S. Pat. No. 4,976,794 (Biddle et al). The disclosure of each of those patents and articles is incorporated herein by reference.

However, none of these references has prepared ABA-type block copolymers that are water or alcohol soluble. Water and/or alcohol solubility is an important property for use in commercial applications, particularly consumer applications where water and/or alcohols are considered the safest solvents. In addition, a need exists in the art of thermoplastic elastomers to make these types of polymers more accessible to different types of applications, meaning that the solubility of the polymers needs to be carefully adjusted for particular uses. For example, the water or alcohol solubility of a thermoplastic elastomer for use as a pressure sensitive adhesive will be less that the solubility of a thermoplastic elastomer for use in cosmetic or hair care applications.

In addition, graft type copolymers are generally known. Graft copolymers however, generally differ from ABA block copolymers in that the grafts are not typically attached to a terminal end portion of the middle B block. Also, the control of the architecture and chemical composition of both the backbone and grafts are usually more difficult to achieve in a graft system as compared to a multiblock copolymer.

SUMMARY OF THE INVENTION

Thus, a need exists for a water or alcohol soluble or dispersible ABA block copolymer.

This invention solves the needs by providing ABA-type block copolymer thermoplastic elastomers that have a tunable solubility in water and/or alcohols. In particular, the polymers of this invention have a block of monomers in the structure that is a random polymerized block comprised of at least two monomers, where at least one of the at least two monomers is a hydrophobic monomer and another of the at least two monomers is hydrophilic. This random block should comprise a sufficient percentage of the overall molecular weight of the block copolymer so that the solubility is adjusted in the desired manner. The hydrophobic and hydrophilic monomers are chosen, preferably, with sufficient difference in their absolute hydrophobicity (or hydrophilicity) so that copolymerization provides the tunability of the invention. In preferred methods, the absolute hydrophobicity is quantified by the absolute difference in the log P of the monomers. In other embodiments, the random block is either the A or B block.

It is another aspect of this invention to provide a method of preparing ABA-type block copolymers that comprises at least one random block by using a living-type free radical polymerization method. The living-type free radical method can be chosen from a variety of known methods, with a nitroxide radical mediated process or a radical additional fragmentation transfer (RAFT) process being particularly preferred. The living-type free radical polymerization method can be applied to formation of one or more of the blocks in the block copolymers of this invention and preferably are applied to formation of all blocks in the copolymer.

Thus, it is an object of this invention to provide a thermoplastic elastomeric polymer having an ABA-type structure with a random block to provide a desired water and/or alcohol solubility.

It is another object of this invention to provide a method of preparing thermoplastic elastomers using a free radical polymerization process, which employs living-type kinetics.

Further aspects and objects of this invention will be evident to those of skill in the art upon review of this specification.

DETAILED DESCRIPTION OF THE INVENTION

Figure 1:
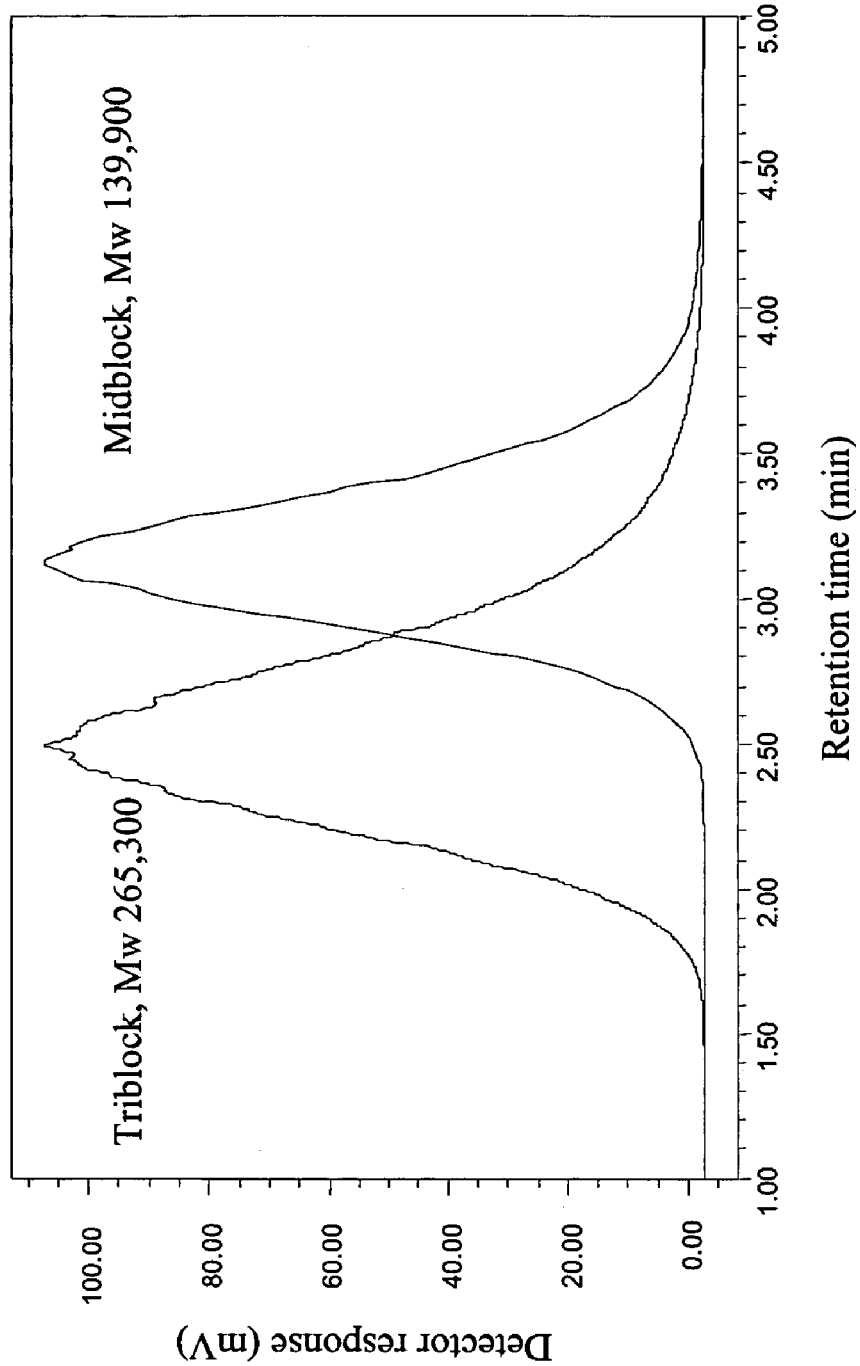
FIG. 1 is a graph showing the molecular weight of a block copolymers as compared to the midblock (i.e., B block) polymerization.

It is also to be understood that the terminology used herein is for the purpose of describing particular embodiments only, and is not intended to be limiting. As used in this specification and the appended claims, the singular forms "a," "an" and "the" include plural referents unless the context clearly dictates otherwise. In describing and claiming the present invention, the following terminology will be used in accordance with the definitions set out below. These definitions are intended to supplement and illustrate, not preclude, the definitions known to those of skill in the art.

The term "alkyl" is used herein to refer to a branched or unbranched, saturated or unsaturated acyclic hydrocarbon radical. Suitable alkyl radicals include, for example, methyl, ethyl, n-propyl, isopropyl, propenyl (or allyl), hexyl, vinyl, n-butyl, tert-butyl, iso-butyl (or 2-methylpropyl), etc. In particular embodiments, alkyls have between 1 and 200 carbon atoms, between 1 and 50 carbon atoms or between 1 and 20 carbon atoms.

"Substituted alkyl" refers to an alkyl as just described in which one or more hydrogen atom to any carbon of the alkyl is replaced by another group such as a halogen, aryl, substituted aryl, cycloalkyl, substituted cycloalkyl, and combinations thereof. Suitable substituted alkyls include, for example, benzyl, trifluoromethyl and the like.

The term "heteroalkyl" refers to an alkyl as described above in which one or more hydrogen atoms to any carbon of the alkyl is replaced by a heteroatom selected from the group consisting of N, O, P, B, S, Si, Se and Ge. The bond between the carbon atom and the heteroatom may be saturated or unsaturated. Thus, an alkyl substituted with a heterocycloalkyl, substituted heterocycloalkyl, heteroaryl, substituted heteroaryl, alkoxy, aryloxy, boryl, phosphino, amino, silyl, thio, or seleno is within the scope of the term heteroalkyl. Suitable heteroalkyls include cyano, benzoyl, 2-pyridyl, 2-furyl, $Me_3SiOCH_2(CH_3)_2C$— and the like.

The term "cycloalkyl" is used herein to refer to a saturated or unsaturated cyclic non-aromatic hydrocarbon radical having a single ring or multiple condensed rings. Suitable cycloalkyl radicals include, for example, cyclopentyl, cyclohexyl, cyclooctenyl, bicyclooctyl, etc. In particular embodiments, cycloalkyls have between 3 and 200 carbon atoms, between 3 and 50 carbon atoms or between 3 and 20 carbon atoms.

"Substituted cycloalkyl" refers to cycloalkyl as just described including in which one or more hydrogen atom to any carbon of the cycloalkyl is replaced by another group such as a halogen, alkyl, substituted alkyl, aryl, substituted aryl, cycloalkyl, substituted cycloalkyl, heterocycloalkyl, substituted heterocycloalkyl, heteroaryl, substituted heteroaryl, alkoxy, aryloxy, boryl, phosphino, amino, silyl, thio, seleno and combinations thereof. Suitable substituted cycloalkyl radicals include, for example, 4-dimethylaminocyclohexyl, 4,5-dibromocyclohept-4-enyl, and the like.

The term "heterocycloalkyl" is used herein to refer to a cycloalkyl radical as described, but in which one or more or all carbon atoms of the saturated or unsaturated cyclic radical are replaced by a heteroatom such as nitrogen, phosphorus, oxygen, sulfur, silicon, germanium, selenium, or boron. Suitable heterocycloalkyls include, for example, piperazinyl, morpholinyl, tetrahydropyranyl, tetrahydrofuranyl, piperidinyl, pyrrolidinyl, oxazolinyl, and the like.

"Substituted heterocycloalkyl" refers to heterocycloalkyl as just described including in which one or more hydrogen atom to any atom of the heterocycloalkyl is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof. Suitable substituted heterocycloalkyl radicals include, for example, N-methylpiperazinyl, 3-dimethylaminomorpholine, and the like.

The term "aryl" is used herein to refer to an aromatic substituent which may be a single aromatic ring or multiple aromatic rings which are fused together, linked covalently, or linked to a common group such as a methylene or ethylene moiety. The common linking group may also be a carbonyl as in benzophenone or oxygen as in diphenylether or nitrogen in diphenylamine. The aromatic ring(s) may include phenyl, naphthyl, biphenyl, diphenylether, diphenylamine and benzophenone among others. In particular embodiments, aryls have between 1 and 200 carbon atoms, between 1 and 50 carbon atoms or between 1 and 20 carbon atoms.

"Substituted aryl" refers to aryl as just described in which one or more hydrogen atom to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphino, alkoxy, amino, thio and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone. Specific examples of substituted aryls include perfluorophenyl, chlorophenyl, 3,5-dimethylphenyl, 2,6-diisopropylphenyl and the like.

The term "heteroaryl" as used herein refers to aromatic rings in which one or more carbon atoms of the aromatic ring(s) are replaced by a heteroatom(s) such as nitrogen, oxygen, boron, selenium, phosphorus, silicon or sulfur. Heteroaryl refers to structures that may be a single aromatic ring, multiple aromatic ring(s), or one or more aromatic rings coupled to one or more nonaromatic ring(s). In structures having multiple rings, the rings can be fused together, linked covalently, or linked to a common group such as a methylene or ethylene moiety. The common linking group may also be a carbonyl as in phenyl pyridyl ketone. As used herein, rings such as thiophene, pyridine, isoxazole, phthalimide, pyrazole, indole, furan, etc. or benzo-fused analogues of these rings are defined by the term "heteroaryl."

"Substituted heteroaryl" refers to heteroaryl as just described including in which one or more hydrogen atoms to any atom of the heteroaryl moiety is replaced by another group such as a halogen, alkyl, substituted alkyl, aryl, substituted aryl, heteroaryl, substituted heteroaryl, alkoxy, aryloxy, boryl, phosphino, amino, silyl, thio, seleno and combinations thereof Suitable substituted heteroaryl radicals include, for example, 4-N,N-dimethylaminopyridine.

The term "alkoxy" is used herein to refer to the —$OZ^1$ radical, where $Z^1$ is selected from the group consisting of alkyl, substituted alkyl, cycloalkyl, substituted cycloalkyl, heterocylcoalkyl, substituted heterocycloalkyl, silyl groups and combinations thereof as described herein. Suitable alkoxy radicals include, for example, methoxy, ethoxy, benzyloxy, t-butoxy, etc. A related term is "aryloxy" where $Z^1$ is selected from the group consisting of aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

As used herein the term "silyl" refers to the —$SiZ^1Z^2Z^3$ radical, where each of $Z^1$, $Z^2$, and $Z^3$ is independently selected from the group consisting of alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein the term "boryl" refers to the $-BZ^1Z^2$ group, where each of $Z^1$ and $Z^2$ is independently selected from the group consisting of alkyl, substituted alkyl, cycloalkyl, heterocycloalkyl, heterocyclic, aryl, substituted aryl, heteroaryl, substituted heteroaryl, alkoxy, aryloxy, amino, silyl and combinations thereof.

As used herein, the term "phosphino" refers to the group $-PZ^1{}_n$, where each of $Z^1$ is independently selected from the group consisting of hydrogen oxygen, substituted or unsubstituted alkyl, cycloalkyl, heterocycloalkyl, heterocyclic, aryl, heteroaryl, silyl, alkoxy, aryloxy, amino and combinations thereof, and where n is 0 to 4 depending on the phosphorus oxidation state.

The term "amino" is used herein to refer to the group $-NZ^1Z^2$, where each of $Z^1$ and $Z^2$ is independently selected from the group consisting of hydrogen; alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

Block Copolymers

As used herein, "A-B-A block copolymer" refers to a polymer comprising at least three segments having at least two differing compositions, where the monomers are not incorporated into the polymer architecture in a solely statistical or uncontrolled manner. Although there may be two, three, four or more monomers in a single block-type polymer architecture, it will still be referred to herein as a block copolymer. The block copolymers of this invention include one or more blocks of random copolymer (sometimes referred to herein as an "R" block) together with one or more blocks of single monomers. Thus, the polymer architecture may be A-R-A, R-B-R, R-B-A, R-R'-R, A-R-B-A or A-R-B-R-A is included herein, where R and R' are random blocks of monomers A and B or of monomers B and C or more or other monomers. Moreover, the random block can vary in composition or size with respect to the overall block copolymer. In some embodiments, for example, the random block will account for between 5 and 80% by weight of the mass of the block copolymer. In other embodiments, the random block R will account for more or less of the mass of the block copolymer, depending on the application. Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1–5) or logarithmic. The random block may be subject to the same kinetic effects, such as composition drift, that would be present in any other radical copolymerization and its composition, and size may be affected by such kinetics, such as Markov kinetics.

Alternatively, a block copolymer having the following structure may be included: $(AB)_n$-Core, where A and B are polymeric blocks and Core is a non-polymeric linking core; wherein at least one of blocks A and B is a random block comprised of two or more monomers, provided that at least one of the two or more monomers is hydrophilic and at least one of the two or more monomers is hydrophobic. Additionally, the absolute difference in log p between the hydrophobic and hydrophilic monomers is at least about 0.5; and n is 2 or more, preferably 2, 4, 6, 8 or 12.

No matter which type of block copolymer structure is used, a general feature of the polymers of this invention is that the A blocks are located at a terminal end portion of the central B block(s). This feature distinguishes the inventive polymers from graft-type thermoplastic elastomers, which are known, because the A blocks are not located long the B block backbone. See, for contrast, U.S. Pat. No. 5,980,878, which discloses graft type thermoplastic elastomers. The B block can take a number of different forms, including for example, linear or star-shaped (the latter also being termed "aerial"). Star-shaped B block polymers may have three or more arms. When the B block polymer is linear, the flanking A block is bound to each end of the core polymer and the resulting block copolymer is an ABA block copolymer. When the B block is star-shaped, a flanking A block is bound to each end of each arm of the B block and the block copolymer therefore contains as many flanking polymers as there are points or free ends in the star shaped polymer. For example, if the star shaped B block polymer has four ends the block copolymer will comprise four flanking A blocks.

The Core is generally a linking core that may be an organic moiety or an inorganic moiety, in either case being linked to the AB arms. A preferred inorganic core can be a silica or silicon substrate, and preferred organic core molecules are dendritic molecules that may be combined with the arms. Preferred core moieties, whether organic or inorganic, include initiator-functionalized cores. The size of the core moiety is not critical, and can range from very small moieties (e.g., moieties comprising only a few atoms—sufficient to provide linking to at least three arms) to larger moieties (including macroscopic substrates).

A "block" within the scope of the block copolymers of this invention typically comprises about 5 or more monomers of a single type (with the random blocks being defined by composition and/or weight percent, as described above). In preferred embodiments, the number of monomers within a single block may be about 10 or more, about 15 or more, about 20 or more or about 50 or more. Each block may have a desired architecture and thus, each block may be linear, branched (with short or long chain branches), star (with 3 or more arms), etc. Other architectures will be apparent to those of skill in the art upon review of this specification.

The existence of a block copolymer according to this invention is determined by methods known to those of skill in the art. For example, those of skill in the art may consider nuclear magnetic resonance (NMR) studies of the block copolymer. Those of skill in the art would also consider the measured increase of molecular weight upon addition of a second monomer to chain-extend a living polymerization of a first monomer. Block copolymer structure can be suggested by observation of microphase separation, including long range order (determined by X-ray diffraction), microscopy and/or birefringence measurements. Other methods of determining the presence of a block copolymer include mechanical property measurements, (e.g., elasticity of hard/soft/hard block copolymers), thermal analysis and gradient elution chromatography (e.g., absence of homopolymer).

Measurement of optical properties, such as absorbance (color and clarity), provides information about the phase morphology and microstructure of the polymer emulsions. Thus, for example, birefringence measurements may indicate the presence of optical anisotropy resulting from microphase separation in hard/soft block copolymers. Likewise, sharp color delineations in optical micrographs of annealed polymer films can indicate the presence of ordered, microphase-separated block copolymer structure.

Block copolymers of sufficiently high molecular weight phase separate on a microscopic scale, to form periodically arranged microdomains which typically comprise predominantly one or the other polymer. These may take the form of lamellae, cylinders, spheres, and other more complex morphologies, and the domain sizes and periods are typically in the range 10–100 nm. Such microphase separation can be detected in a variety of ways, including electron microscopy, x-ray or neutron scattering or reflectivity, measurement of optical anisotropy, and rheological measurements. The absence of a periodic microstructure is not necessarily evidence against having synthesized a block copolymer, as such absence may be due to low molecular weight, broad molecular weight distribution of the individual blocks, weak intermolecular interactions, or inadequate time and slow kinetics for microphase separation. However, the presence of a periodic microstructure on the 10–100 nm scale is considered extremely compelling evidence for block copolymer formation in accord with this invention. Note though that a periodic microstructure is not needed for implementing the block copolymers of this invention.

Block copolymers are well-known to form terraced films, where the film thickness is restricted to integer or half-integer multiples of the microstructure period. This occurs because preferential interactions of one or the other block with the substrate and/or free surface cause a layering of the microdomains parallel to the film surface (see for example G. Coulon, D. Ausserre, and T. P. Russell, *J. Phys.* (Paris) 51, 777 (1990); and T. P. Russell, G. Coulon, V. R. Deline, and D. C. Miller, *Macromolecules* 22, 4600-6 (1989)). When observed in a reflection microscope (on a reflecting substrate such as a silicon wafer), the terracing manifests itself as a series of discrete, well-defined colors with sharp boundaries between them. The colors are a result of interference between light reflected from the top and bottom surfaces of the film, and depend on the local film thickness ("Newton's rings"). If terracing does not occur, the colors blend continuously from one into the other.

The presence of chemically homogeneous sequences within block copolymers leads to a phase transition known as microphase separation. Energetically unfavorable interactions between chemically distinct monomers drive the blocks to separate into spatially distinct domains. Since the blocks are covalently bound together, these domains are comparable in size to the dimensions of the polymers themselves. The presence of these domains alters the physical properties of the materials, giving the resulting composite many of the chemical and physical characteristics of each block.

The glass transition temperature (Tg) of the A blocks is typically from 0 to 300° C., preferably from 25 to 175° C., more preferably from 30 to 150° C. The glass transition temperature of the B block(s) is typically from –200 to 150° C., preferably from –100 to 75° C., more preferably from –60 to 50° C. and even more preferably from –60 to 30° C. Those skilled in the art will appreciate that the particular Tg values in any given case will depend on the overall nature of the polymer and the identity of the particular blocks. The main requirement is that the A blocks constitute hard blocks and the B block(s) constitute be a soft block.

Tg or glass transition is a well-known term in polymer science that is used to describe the temperature at which a polymer or a segment thereof undergoes a transition from a solid or brittle material to a liquid or rubber-like material. The glass transition temperature can be measured by a variety of standard techniques that are well known in polymer science. A common technique for the determination of glass transition temperature is differential scanning calorimetry, commonly known as DSC. The glass transition phenomenon in polymers is described in polymer textbooks and encyclopaedias, for example "Principles of Polymer Chemistry", A Ravve, Plenum Press, New York and London 1995, ISBN 0-306-44873-4.

The B block(s) typically has a number average molecular weight of from 100 to 10,000,000 Da (preferably from 2,000 to 200,000 Da, more preferably from 10,000 to 100,000 Da) and a weight average molecular weight of from 150 to 20,000,000 Da (preferably from 5,000 to 450,000 Da, more preferably from 20,000 to 400,000 Da). The A blocks preferably have a number average molecular weight of from 80 to 500,000 Da (preferably from 100 to 100,000 Da, more preferably from 100 to 20,000 Da) and a weight average molecular weight of from 80 to 700,000 Da (preferably from 100 to 250,000 Da, more preferably from 200 to 50,000 Da). The molar ratio of the B block to A block is typically from 1:10 to 10:1, and preferably from 3:1 to 10:1. Generally, different applications of the novel copolymers will use different relative sizes of the A blocks to the B blocks. In some embodiments, the A blocks should be of similar size to those of the B blocks and the number average molecular weight of each A block will be within 20% of the number average molecular weight of the B block. In other embodiments, the B block should be much larger than the A block, for example, in those applications where a hydrophobic A block is used, the A block might be large enough to allow for agglomeration of the A blocks, but not for the B blocks; in these applications, the number average molecular weight of each A block is typically less than about 50% of the number average molecular weight of the B block.

The block copolymers of the invention preferably have elastic moduli of from 1 to 1000 mPa, determined at 10 Hz, 1% strain, 25° C. in a simple tension geometry after two days of equilibration at 50% relative humidity, 25° C. The viscosity of the block copolymers preferably ranges from 3 to 12 mPas, as estimated for 5 wt % polymer in 50 vol % aqueous ethanol solution at 25° C. using capillary viscometry and assuming a viscosity for deionised water of 1 mPas.

Block Copolymer Synthesis

Generally, it is preferred that the block copolymers of this invention are prepared, at least in part, using a living-type polymerization reaction. Some embodiments use the sequential addition of different monomers or monomer mixtures to living-type polymerization reaction mixture. In these embodiments, for example, an initiator and, optionally, a control agent are combined with one or more monomers that comprise the B block to form a polymerization mixture, which is then subjected to or is under polymerization conditions causing a polymerization reaction. The B block is grown to a desired point (e.g., molecular weight or degree of polymerization). The monomer or monomer mixture to make the B block is used up or removed, the monomer or monomer mixture to synthesize the A block is added to the polymerization reaction mixture, and the A block is grown to a desired size. Depending on the polymerization method being practiced, there may or may not be a non-polymeric core in the B block. For example, using one preferred method that employs a bis-functional nitroxide based initiator-control agent adduct, a non-polymeric core will exist in the B block, which is the residue of the adduct. Also for example, the B block will not have a non-polymeric core in those embodiments where a telechelic polymer is formed as the B block in an uncontrolled polymerization reaction, this B block polymer is then modified to add control agent to the ends of the polymer and then the A blocks are grown (in this embodiment, linker molecules may exist between the A and B blocks). Generally in this embodiment, the addition of a pre-assembled functionalized B block (such as a telechelic oligomer or polymer) to a free radical polymerization mixture yields a block copolymer (e.g., the polymerization mixture may be controlled or "living"). As a further example, the B block does not have a non-polymeric core using a living type free radical polymerization technique, such as radical addition fragmentation transfer (RAFT), ATRP, etc. methods to grow the B block in a controlled polymerization reaction to a desired point, the monomer(s) for the B block may be consumed or any remainder removed and then the A blocks grown. These embodiments show that un-controlled and controlled (or living-type) polymerization methods may be used together to form the desired block copolymer.

Ideally, the growth of each block occurs with high conversion. Conversions are determined by NMR via integration of polymer to monomer signals. Conversions may also be determined by size exclusion chromatography (SEC) via integration of polymer to monomer peak. For UV detection, the polymer response factor must be determined for each polymer/monomer polymerization mixture. Typical conversions can be 50% to 100% for each block, more specifically in the range of from about 60% to about 90%). Intermediate conversion can lead to block copolymers with a random copolymer block separating the two or more homopolymer blocks, depending on the relative rates of polymerization and monomer addition.

Hawker et al., "Development of a Universal Alkoxyamine for 'Living' Free Radical Polymerizations," *J. Am. Chem. Soc.*, 1999, 121(16), pp. 3904–3920 discloses a nitroxide mediated processes that may be used herein. Also, polymerization processes disclosed in U.S. patent application Ser. No. 09/520,583, filed Mar. 8, 2000 and corresponding international application PCT/US00/06176 are particularly preferred, and both of these applications are incorporated herein by reference.

Generally, the polymerization proceeds under polymerization conditions. Polymerization conditions include the ratios of starting materials, temperature, pressure, atmosphere and reaction time. The polymerization conditions that may be used for nitroxide mediated living type free radical polymerization include: Temperatures for polymerization are typically in the range of from about 80° C. to about 130° C., more preferably in the range of from about 95° C. to about 130° C. and even more preferably in the range of from about 120° C. to about 130° C. The atmosphere may be controlled, with an inert atmosphere being preferred, such as nitrogen or argon. The molecular weight of the polymer can be controlled via controlled free radical polymerization techniques or by controlling the ratio of monomer to initiator. Generally, the ratio of monomer to initiator is in the range of from about 200 to about 800. In a nitroxide radical controlled polymerization the ratio of control agent to initiator can be in the range of from about 1 mol % to about 10 mol % is preferred. The polymerization may be carried out in bulk or in a suitable solvent such as diglyme. Polymerization reaction time may be in the range of from about 0.5 hours to about 72 hours, preferably from about 1 hour to about 24 hours and more preferably from about 2 hours to about 12 hours. When RAFT living polymerization method is implementeed, the polymerization conditions that may be used include temperatures for polymerization typically in the range of from about 20° C. to about 110° C., more preferably in the range of from about 50° C. to about 90° C. and even more preferably in the range of from about 70° C. to about 85° C. The atmosphere may be controlled, with an inert atmosphere being preferred, such as nitrogen or argon. The molecular weight of the polymer is controlled via adjusting the ratio of monomer to control agent. When a RAFT-type technique is used the control agent is defined as

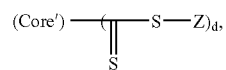

discussed below. Generally, with RAFT the ratio of monomer to control agent is in the range of from about 200 to about 800. A free radical initiator is usually added to the reaction mixture, so as to maintain the polymerization rate to an acceptable level. Conversely, a too high free radical initiator to control agent ratio will favor unwanted dead polymer formation, namely pure homopolymers or block copolymers of unknown composition. The molar ratio of free radical initiator to control agent for polymerization are typically in the range of from about 2:1 to about 0.02:1.

Initiators in the RAFT process that may be used are known in the art, and may be selected from the group consisting of alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, and azo compounds. Specific initiators include BPO and AIBN. The reaction media for these polymerization reactions is either an organic solvent or bulk monomer or neat. Optionally, the dithio moiety of the control agent can be cleaved by chemical or thermal ways, if one wants to reduce the sulfur content of the polymer and prevent any problems associated with presence of the control agents chain ends, such as odor or discoloration. Typical chemical treatment include the catalytic or stochiometric addition of base such as a primary amine, acid or anhydride, or oxydizing agents such as hypochloride salts.

In some embodiments, this invention will employ a multifunctional chain transfer agent that may be characterized by the general formula:

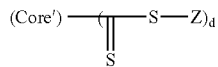

wherein Core' is a core molecule, S is sulfur and Z is any group that activates the C=S double bond towards a reversible free radical addition fragmentation reaction and may be selected from the group consisting of amino and alkoxy. In other embodiments, Z is attached to C=S through a carbon atom (dithioesters), a nitrogen atom (dithiocarbamate), a sulfur atom (trithiocarbonate) or an oxygen atom (dithiocarbonate). Specific examples for Z can be found in WO98/01478, WO99/35177, WO99/31144, and WO98/58974, each of which is incorporated herein by reference. In addition, d is 2 or more, preferably 4 or more and even more preferably 6 or more. In preferred embodiments, d is 2.

In other embodiments, the multi-functional initiators are initiator-control agent adducts that are polyfunctional nitroxide initiators capable of initiating multiple free radical polymerizations. Such initiator-control agent adducts include, for example, polyfunctional adducts characterized by the formula:

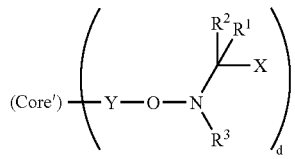

where Core' and d are defined above and wherein Y is a residue capable of initiating a free radical polymerization upon homolytic cleavage of the Y—O bond, the residue being selected from the group consisting of fragments derived from a free radical initiator, alkyl, substituted alkyl, alkoxy, substituted alkoxy, aryl, substituted aryl, and combinations thereof; X is a moiety that is capable of destabilizing the control agent on a polymerization time scale; and each $R^1$ and $R^2$, independently, is selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, and combinations thereof; and $R^3$ is selected from the group consisting of tertiary alkyl, substituted tertiary alkyl, aryl, substituted aryl, tertiary cycloalkyl, substituted tertiary cycloalkyl, tertiary heteroalkyl, tertiary heterocycloalkyl, substituted tertiary heterocycloalkyl, heteroaryl, substituted heteroaryl, alkoxy, aryloxy and silyl. Preferably, X is hydrogen and d is 2.

The Core' molecule in the multifunctional initiators herein may be selected from the group consisting of dendritic molecules, small molecules and polymers with at least two terminus ends. The chain transfer agent, initiator and/or initiator control agent adduct are attached to two or more points of the Core' molecule. In the case of polymers with at least two terminus ends, each chain transfer agent, initiator and/or initiator control agent adduct is attached to the terminal end portions of the polymer. Specific examples of Core' molecules include:

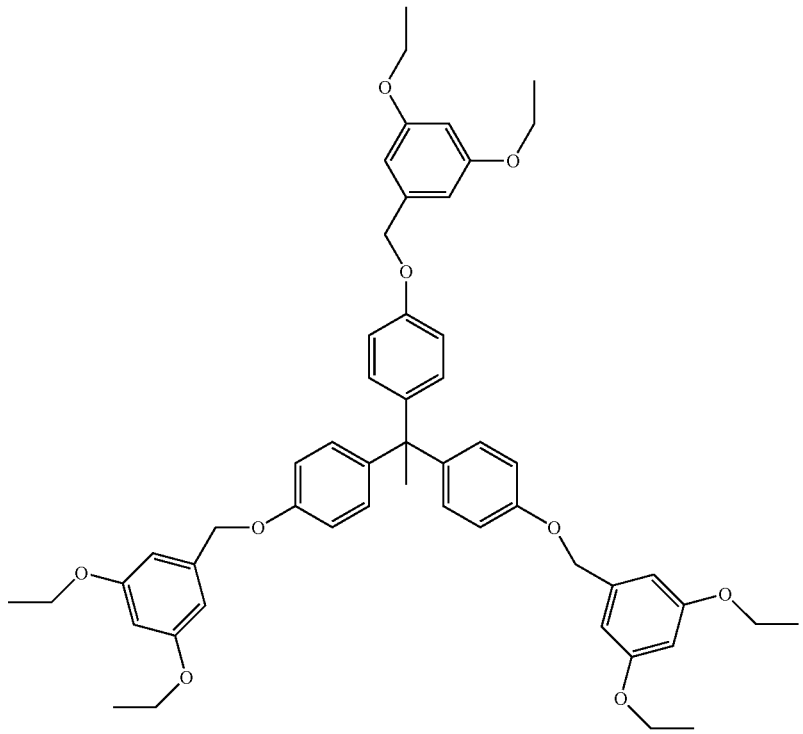

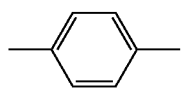 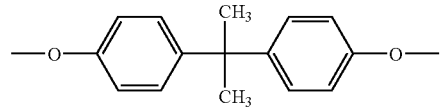

Generally, those of skill in the art will appreciate that the Core linking group defined above in connection with the block copolymers of this invention will typically include the Core' molecule and any additional atoms from the chain transfer agent, initiator or initiator residue. Alternatively the core of $(AB)_n$-Core can be formed after the polymerization, whereby a AB block is grown by living free radical polymerization by virtue of a control agent bound to the B terminus, said control agent being allowed to react with a multi-functional compound (having functionalities equal to n) to form the desired blocked copolymers $(AB)_n$-Core. An example of such strategy is given below:

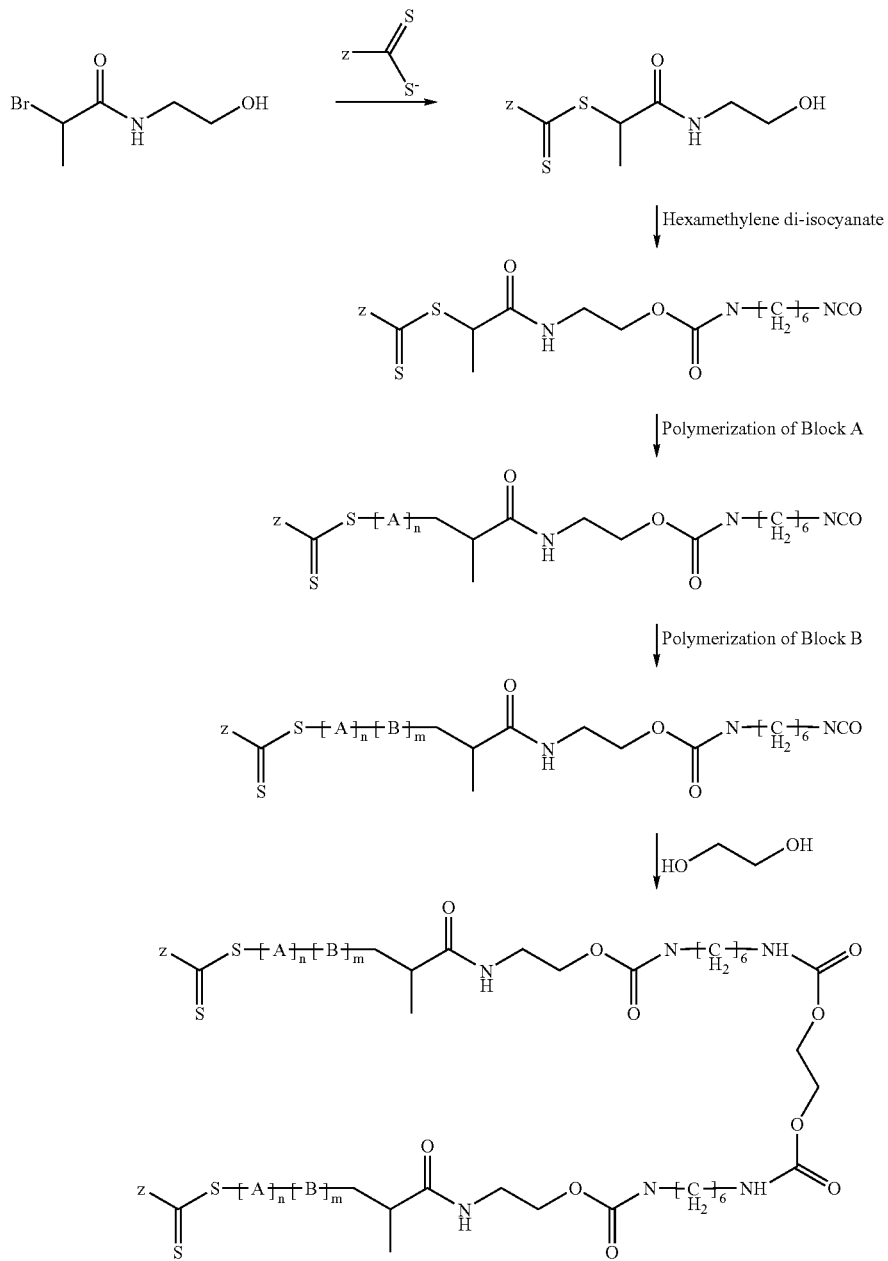

In still other embodiments, the Core' molecule is a polymer having at least two, and preferably only two, end terminal portions. In these embodiments, the Core' molecule may comprise the B block in the copolymers of this invention. For example, the B block may be a linear telechelic polymer having two terminal end portions, which is formed in a controlled or uncontrolled polymerization process. After formation of the B block, the molecules needed for a living-type free radical polymerization are added to the two terminal end portions and the A block is grown therefrom. For example, a B block can be formed by polyaddition between a diol and and di-isocyanate. The ratio of the di-isocyanate to the diol is chosen slightly above the stochiometric ratio as to form a polyurethane with both termini capped with isocyanate groups, such as described below:

The substitutions on the B block may be generalized for the different possible living-type mechanisms that may be employed based on the above formulas.

From these polymerization methods, it will be evident to those of skill in the art that linking atoms may exist between the A and B blocks. These linking atoms are typically artifacts of the particular polymerization mechanism employed. The existence of the linking atoms does not necessarily affect the properties of the block copolymers herein and are not intended to be excluded from the definition of the block copolymers no matter which formula is used, such as A-B-A, A-R-A, etc.

Monomer Selection

The monomers chosen for the A and B blocks are typically selected in a manner so as to produce a block copolymer

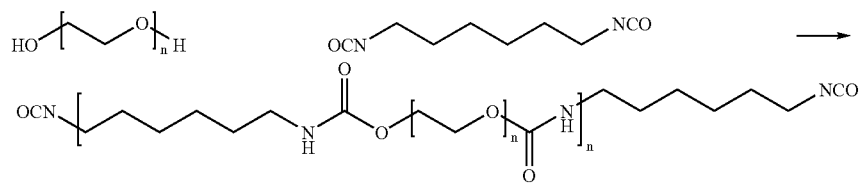

where n is the degree of polymerization. Afterwards, an —OH functional initiator or initiator control agent adduct is attached to each end of the B block. The initiators or initiator control agent adducts can be chosen from those described above. For example, with an alkoxyamine initiator control agent adduct, the modified B block with the initiator-control agents attached (and hence meeting the definition of a polymer Core' molecule) may have the structure:

with balanced hydrophilic/hydrophobic character. The copolymer may be, for example, soluble in water, ethanol or mixtures thereof or soluble in other diluents or carriers.

To balance the hydrophilic/hydrophobic character of the block copolymers of this invention, the block copolymers have at least one block that is a random copolymerization of at least one hydrophilic monomer and at least one hydrophobic monomer, and this random block is preferably the B

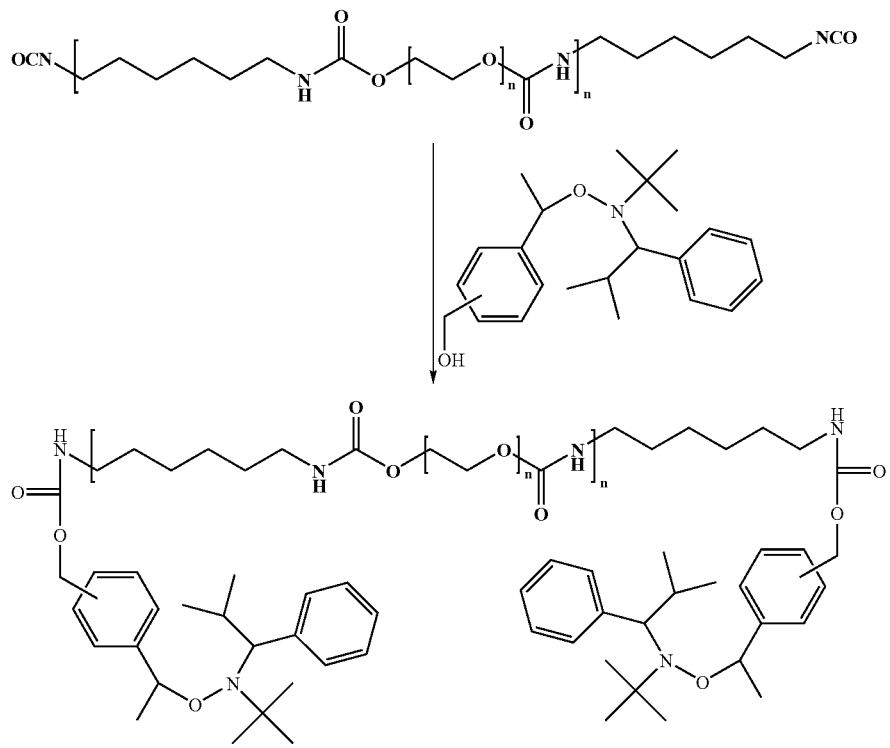

block(s). The monomers are chosen for the random block for their particular hydrophilic or hydrophobic characteristics. The hydrophobicity or hydrophilicity of the chosen monomers may be determined qualitatively so that a ratio of the at least two monomers in the random block such that an increase in the proportion of the at least one hydrophobic monomer results in a decrease in the miscibility or dispersability of the overall block copolymer. Conversely, the ratio of the two or more monomers in the random block may be chosen such that a decrease in the proportion of the at least one hydrophobic monomer results in an increase in the miscibility or dispersability of the overall block copolymer. The ratio of the hydrophobic monomer to the hydrophilic monomer is adjusted depending upon the relative hydrophobicity of the two or more monomers in the random block. Thus for example, in a random block containing a weakly hydrophilic and a strongly hydrophobic monomer, the random block may contain a relatively large concentration of the weakly hydrophilic monomer and a relatively small concentration of the strongly hydrophobic monomer. A specific example is a copolymer containing a random block of N,N-dimethylacrylamide and methyl methacrylate. In that case, a smaller amount of methyl methacrylate is needed for the random block to give the copolymer the desired solublity properties, such that the ratio of N,N-dimethylacrylamide to methyl methacrylate can be in the range of from about 1:1 to about 4:1, which is a range that may be used with other monomers in the invention.

Quantitatively, the hydrophobic/hydrophilic nature of the monomers may be determined according to the log P of the particular monomers, which is sometimes referred to as the octanol-water partition coefficient. Log P values are well known and are determined according to a standard test that determines the concentration of monomer in a water/1-octanol separated mixture. In particular, computer programs are commercially available as well as on the internet that will estimate the log P values for particular monomers. Some of the log P values in this application were estimated from the web site http:H/esc.syrres.com/interkow/kowdemo.htm, which provides an estimated log P value for molecules by simply inserting the CAS registry number or a chemical notation. Hydrophobic monomers typically will have a log P value above zero and hydrophilic monomers typically will have a log P value close to or below zero. For example, the following hydrophobic monomers have the following log P values: styrene—about 2.95, n-butylacrylate—about 2.36, and tert-butylacrylate—about 2.09. On the other hand, for example, the following hydrophilic monomers have the following log P values: acrylic acid—about 0.35, 2-methoxyethylacrylate—about 0.45, and 2-hydroxyethylmethacrylate—about 0.47. Other hydrophilic monomers and their lop p values include acrylamide (lop p of about –0.67) and 2-hydroxyethylacrylate (lop p of about –0.21). Log P values just listed were obtained from either the web site listed above or from Hansch et al. *Exploring QSAR: Hydrophobic, Electronic, and Steric Constants* (ACS Professional Reference Book, 1995), which is incorporated herein by reference. Generally, the absolute difference between a hydrophobic and hydrophilic monomer for the purposes of this invention should be at least about 0.5, more preferably at least about 0.75, even more preferably at least about 1.0, still more preferable at least about 1.5 and most preferably at least about 2.

Suitable hydrophilic monomers (with approximate log P values listed in parentheses) may be listed above and include, but are not limited to, acrylic acid (0.35), methacrylic acid (0.93), N,N-dimethylacrylamide (–0.13), dimethyl aminoethyl methacrylate (0.97), quaternized dimethylaminoethyl methacrylate, methacrylamide (–0.26), N-t-butyl acrylamide (1.02), maleic acid (–0.48), maleic anhydride and its half esters, crotonic acid (0.72), itaconic acid (–0.34), acrylamide (–0.67), acrylate alcohols, hydroxyethyl methacrylate, diallyldimethyl ammonium chloride, vinyl ethers (such as methyl vinyl ether), maleimides, vinyl pyridine, vinyl imidazole (0.96), other polar vinyl heterocyclics, styrene sulfonate, allyl alcohol (0.17), vinyl alcohol (such as that produced by the hydrolysis of vinyl acetate after polymerization), salts of any acids and amines listed above, and mixtures thereof. Preferred hydrophilic monomers include acrylic acid, N,N-dimethyl acrylamide (–0.13), dimethylaminoethyl methacrylate (0.97), quaternized dimethyl aminoethyl methacrylate, vinyl pyrrolidone, salts of acids and amines listed above, and combinations thereof.

Suitable hydrophobic monomers may be listed above and include, but are not limited to, acrylic or methacrylic acid esters of $C_1$–$C_{18}$ alcohols, such as methanol, ethanol, methoxy ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, t-butanol (2-methyl-2-propanol), cyclohexanol, neodecanol, 2-ethyl-1-butanol, 3-heptanol, benzyl alcohol, 2-octanol, 6-methyl-1-heptanol, 2-ethyl-i -hexanol, 3,5-dimethyl-1-hexanol, 3,5,5-tri methyl-1-hexanol, 1-decanol, 1-dodecanol, 1-hexadecanol, 1-octa decanol, and the like, the alcohols having from about 1 to about 18 carbon atoms, preferably from about 1 to about 12 carbon atoms; styrene; polystyrene macromer, vinyl acetate; vinyl chloride; vinylidene chloride; vinyl propionate; alpha-methylstyrene; t-butylstyrene; butadiene; cyclohexadiene; ethylene; propylene; vinyl toluene; and mixtures thereof. Preferred hydrophobic monomers (with approximate log P values listed in parentheses) include n-butyl methacrylate (2.36), isobutyl methacrylate (2.66), t-butyl acrylate (2.09), t-butyl methacrylate (2.54), 2-ethylhexyl methacrylate (4.09), methyl methacrylate (1.38), vinyl acetate (0.73), vinyl acetamide, vinyl formamide, and mixtures thereof, more preferably t-butyl acrylate, t-butyl methacrylate, or combinations thereof.

The term "water or alcohol soluble or dispersible" as used herein means that the copolymers are either freely soluble in or dispersible (as a stable suspension) in at least one of the following solvents, or alternatively, in any combination of one of the following solvents: water, methanol, ethanol, and isopropanol. "Soluble" and/or "miscible" herein means that the copolymer dissolves in the solvent or solvents at 25° C. at a concentration of at least about 20 mg/mL, more preferably about 50 mg/mL, and most preferably about 100 mg/mL. "Dispersible" means that the copolymer forms a stable, uniform suspension (without the addition of further materials such as emulsifiers) when combined with the solvent or solvents at about 25° C. at a concentration of at least about 20 mg/mL, more preferably about 50 mg/mL, and most preferably about 100 mg/mL.

EXAMPLES

General: In the examples of this invention, the following abbreviations are used: "DMA"=N,N-dimethylacrylamide; "MEA"=(2-methoxyethyl)acrylate and "(MEA-co-tBA)"=poly((2-methoxyethyl)acrylate-copolymerized with -tert-butyl acrylate). Syntheses of initiator and/or initiator control agent adducts were carried out under a nitrogen or argon atmosphere. Other chemicals were purchased from commercial sources and used as received, except for monomers, which were filtered through a short column of basic aluminum oxide to remove the inhibitor and degassed by applying vacuum. All polymerization mixtures were prepared in a glove box under a nitrogen or argon atmosphere and sealed, and polymerization was conducted at 125° C. Size Exclusion Chromatography was performed using automated rapid GPC system. In the current setup N,N-dimethylformamide containing 0.1% of trifluoroacetic acid was used as an eluent and polystyrene-based columns. All of the molecular weight results obtained are relative to linear polystyrene standards. NMR was carried out using a Bruker spectrometer (300 MHz) with CDCl₃ (chloroform-d) as solvent.

Example 1

This example shows the synthesis of the bis-initiator control agent adduct that was used in the subsequent polymerization experiments, generally following scheme

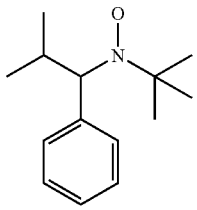

The free nitroxide was prepared according to literature procedures published by Hawker et al., Id. The preparation follows the general procedure below.

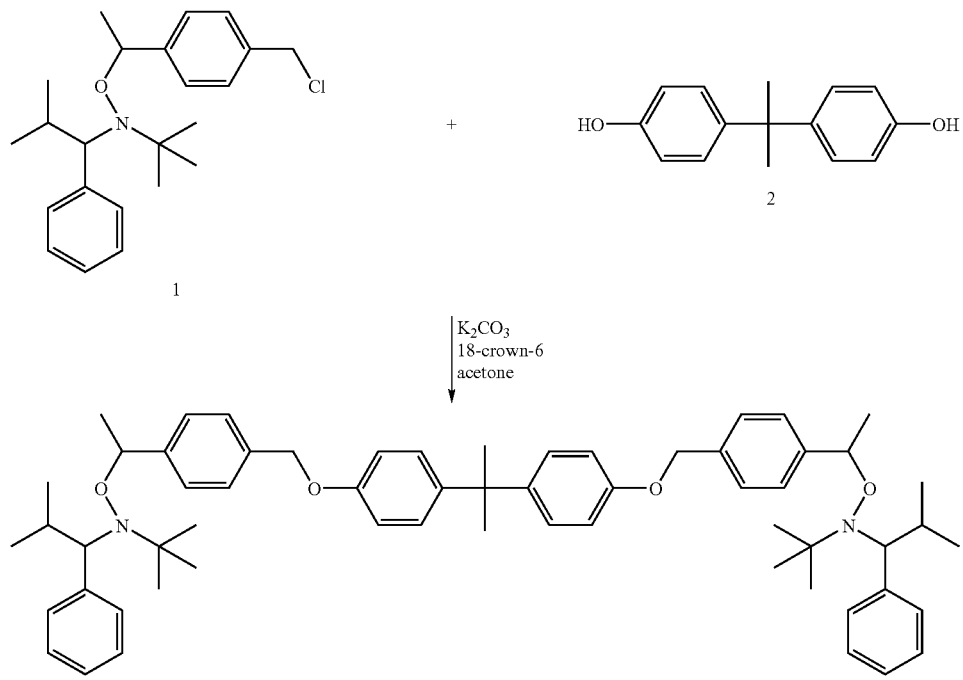

Compound 1 was prepared according to a literature procedure (Hawker et al, *J. Am. Chem. Soc.*, 1999, 121(16), 3904–3920, which is incorporated herein by reference). Compound 1 (10.0 g, 26.74 mmol), bis-phenol 2 (2.98 g, 13.05 mmol), potassium carbonate (18.48 g), 18-crown-6 (0.50 g) and acetone (250 mL) were mixed and heated at reflux for 18 hours, then cooled to room temperature. The reaction mixture was filtered and evaporated, and the residue was partitioned between dichloromethane (200 mL) and water (200 mL). The organic layer was separated, dried with sodium sulfate, and evaporated to dryness. The crude product was purified by flash chromatography, affording the product as a white solid (7.50 g).

Examples 2–7

These examples show preparation of ABA block copolymers using the bis-initator control agent prepared in Example 1. In each of these examples, the free radical nitroxide is Preparation of B block Bis-initiator (0.100 mL, 28.1 mg/mL solution in MEA), MEA (0.0922 mL) and free nitroxide (0.0078 mL, 0.88 mg/mL solution in MEA) were mixed in a 1 mL glass vial under argon, and heated at 125° C. with vigorous stirring for 6 hrs, then cooled to room temperature. The conversion was 80% as measured by ¹H-NMR.

Preparation of triblock copolymer (ABA)

To the polymerization mixture above, DMA, diglyme (0.2 mL) and free nitroxide (0.0777 mL, 0.88 mg/mL solution in diglyme) were added. The amount of DMA varied from 0.108 mL to 0.491 mL depending on examples. The mixture was heated at 125° C. for 14 hours, then cooled to room temperature. Polymer was dissolved in acetone, and precipitated into hexane. The polymer was collected and dried, affording product as a viscous liquid.

In the examples 2 to 7, the un-polymerized MEA was not removed prior to addition of DMA. This will initially result in copolymerization of MEA and DMA (until all of the MEA is incorporated) and hence a broad transition from MEA to DMA along the backbone of the chain, which is indicated in the sequence column in Table 1 as a random block R".

Examples 8–21

Examples 8–21 generally follow the procedures below.
Preparation of random B block
Bis-initiator (0.4167 g, 0.461 mmol from Example 1), MEA (27.00 g, 207.47 mmol), tert-butyl acrylate (2.95 g, 23.02 mmol) and free nitroxide (2.03 mg, 0.00923 mmol) were mixed in a 100 mL flask under argon, and heated at 125° C. with vigorous stirring for 5 hrs, then cooled to room temperature. The conversion was 72% for both monomers as measured by $^1$H-NMR. The reaction mixture was dissolved in acetone (50 mL), and precipitated into hexane (500 mL). The polymer was collected and dried under vacuum at 45° C., affording a clear viscous liquid (21.41 g).
Preparation of triblock copolymer (ABA)
B block polymer (15.0 g), diglyme (15 g), DMA (76.15 g) and free nitroxide (1.78 mL, 2.0 mg/mL solution in diglyme) were mixed in a 500 mL flask under argon. The mixture was stirred and heated at 125° C. for 7 hrs, then cooled to room temperature. The mixture was dissolved in acetone (200 mL), and precipitated into hexane (1000 mL). The precipitation process was repeated once. The triblock copolymer was collected and dried under vacuum (56 g). Table 1, below, lists properties of the obtained block copolymers.

Example 22

Part A: Preparation of the Chain Transfer Agent 4 According to the Following Scheme:

Preparation of compound 4: To a stirred suspension of NaH (0.22 g) in DMSO (15 mL), pyrrole (0.61 mL) is added, and the resulting mixture is stirred for 1 hour. Then, carbon disulfide (0.52 mL) is added, and solution is stirred for another hour, followed by addition of compound 3 (0.86 g) dissolved in DMSO (3 mL). The mixture is stirred for 3 hours, and poured into water (160 mL), and extracted with $CH_2Cl_2$ (100 mL×2). The combined $CH_2Cl_2$ extracts are dried with $MgSO_4$, filtered through a short column of silica gel, and evaporated. The crude product is recrystallized from ethyl acetate, yielding the chain transfer agent 4 as a yellow solid.

Part B: Polymerization
Preparation of Midblock (B block)
Chain transfer agent 4, MEA, tert-butyl acrylate and 2,2'-azobisisobutyronitrile (AIBN) are mixed in a 50 mL flask under argon, and heated at 60° C. with vigorous stirring for 6 hrs, then cooled to room temperature. The reaction mixture is dissolved in acetone, and precipitated into hexane. The polymer is collected and dried under vacuum.
Preparation of Triblock Copolymer (ABA)
Midblock polymer, diglyme, DMA and AIBN are mixed in a 100 mL flask under argon. The mixture is stirred and heated at 60° C. for 2 hrs, then cooled to room temperature. The mixture is dissolved in acetone, and precipitated into hexane. The precipitation process may be repeated. The triblock copolymer is collected and dried under vacuum.

Characterization
Size exclusion chromatography (SEC) characterization is performed in N,N-dimethylformamide (DMF), and molecular weights are calculated using a calibration obtained with

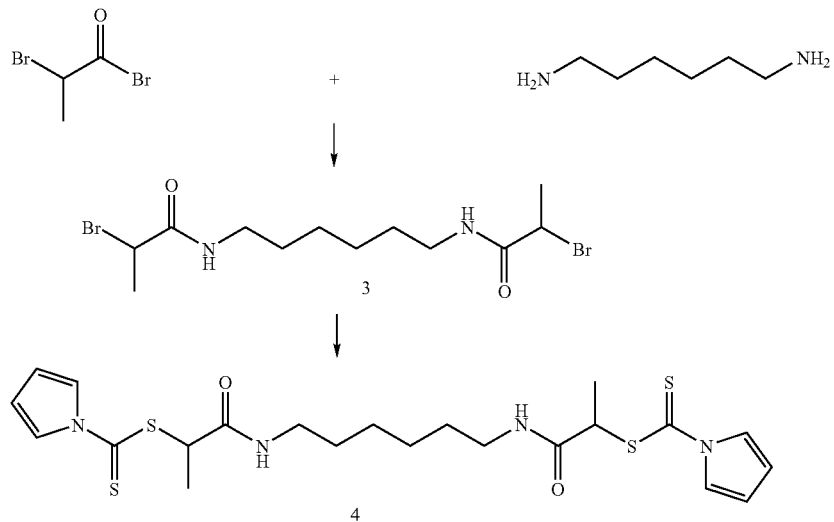

Preparation of compound 3: To a solution of 2-bromopropionyl bromide (6.76 mL) in $CH_2Cl_2$ (30 mL), hexamethylenediamine (3.0 g) is dissolved in $CH_2Cl_2$ (20 mL) and triethylamine (14.4 mL) is added dropwise. After the addition is completed, the reaction mixture is stirred at room temperature for 3 hours, and $CH_2Cl_2$ (50 mL) is added. The $CH_2Cl_2$ solution is washed with water and saturated $Na_2CO_3$ aqueous solution, dried with $MgSO_4$, and evaporated. Recrystalization from ethyl acetate will afforded the compound 3 as a white solid.

polystyrene standards. The chain extension of triblock copolymers from midblock polymers can be clearly observed from SEC data. FIG. 1 shows data from a copolymer after polymerization of the midblock (i.e., B block), and after addition of the endblocks (i.e., A blocks) to the midblock (from Example 15). Initially, the midblock polymer above has a molecular weight of 139,900 g/mol. After chain extension with DMA, the molecular weight of the resulting triblock copolymer increases to 265,300 g/mol (relative to polystyrene standards).

Triblock copolymers are also characterized by $^1$H-NMR in CDCl$_3$. Signals from different blocks can be clearly seen, and are consistent with proposed chemical structure of triblock copolymers. The composition of triblock copolymers (molar ratio of MEA/DMA) may be calculated by comparison of relative integration of signals from different blocks.

Figure 2:
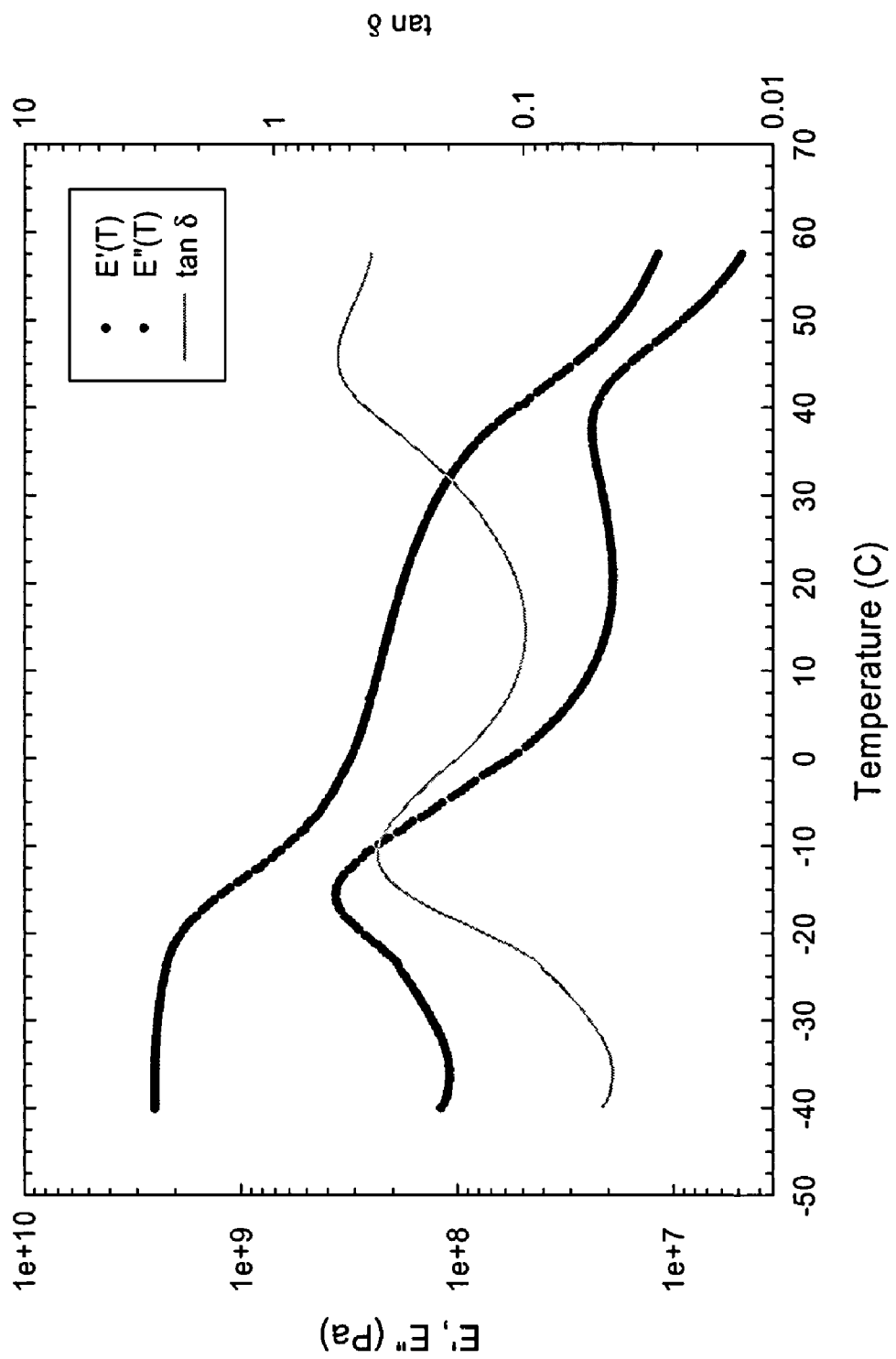
FIG. 2 is a graph showing the cross over point of shows the in-phase (E') and the out-of-phase (E") components of the complex solid modulus E* for the triblock copolymer from Example 15.

FIG. 2 shows the in-phase (E') and the out-of-phase (E") components of the complex solid modulus E* for a representative triblock copolymer of DMA, MEA, and tert-butyl acrylate (tBA) as a function of temperature at a frequency of 10 Hz, a strain amplitude of 0.1%, and a heating rate of 2.5° C./min. A DMA-(MEA-co-tBA)-DMA copolymer with number-average block molecular weights of 14,000–46,000–14,000 g/mol, respectively, a DMA content of 45 mol %, and a tBA content in the B block of 10 mol % was molded at 120° C. into a sheet 1.24 mm thick. This sheet was trimmed into a bar measuring 9.5×10 mm and mounted in the single cantilever test fixture of a Rheometric Scientific DMTA-IV dynamic mechanical thermal analyzer. The sample was cooled to −50° C. and permitted to equilibrate for at least five minutes before the settings of the sample fixture clamps were adjusted to hold the polymer in place at this temperature. The sample was then returned to −50° C. and permitted to equilibrate for another five minutes prior to measurement. The polymer exhibits two glass transitions, at −15° C. and 45° C., as indicated by maxima in the curve of E"(T). These values are considerably different than those measured for pure MEA and DMA (−50° C. and 100° C., respectively); the discrepancies reflect the finite heating rate used in this experiment, the presence of 10 mol % tBA in the MEA block (for which $T_g$=50° C.), and the mixing of MEA and DMA across the interfaces separating MEA-rich and DMA-rich domains.

Number average molecular weights (Mn) for the B block are calculated from the monomer-to-initiator ratios, and the conversion of monomer as measured by NMR (generally about 80%), assuming the polymerization process has living-type kinetics. Mn for A blocks are calculated from DMA mole fractions and Mn values of B block polymers. DMA mole fractions are determined by NMR.

Modulus (E) was determined at 10 Hz, 1% strain, 25° C. in a simple tension geometry after two days of equilibration at 50% relative humidity, 25° C. Viscosity (0) was estimated for 5 wt % polymer in 50 vol % aqueous ethanol solution at 25° C. using capillary viscometry and assuming a viscosity for deionized water of 1 cp.

The data for polymerization examples is summarized in Table 1:

TABLE 1

| Example | Sequence | M$_n$ (kg/mol) | DMA fraction (mol) | E (MPa) | η (mPas) |
|---|---|---|---|---|---|
| 2 | DMA-R"-MEA-R"-DMA | 5-52-5 | 0.21 | <2 | 7 |
| 3 | DMA-R"-MEA-R"-DMA | 6-52-6 | 0.23 | <2 | 6 |
| 4 | DMA-R"-MEA-R"-DMA | 9-52-9 | 0.32 | 32 | 13 |
| 5 | DMA-R"-MEA-R"-DMA | 14-52-14 | 0.41 | 44 | 7 |
| 6 | DMA-R"-MEA-R"-DMA | 15-52-15 | 0.43 | 46 | 8 |
| 7 | DMA-R"-MEA-R"-DMA | 18-52-18 | 0.47 | 50 | 8 |
| 8 | DMA-(MEA-co-tBA)-DMA | 80-46-80 | 0.82 | 560 | 11.6 |
| 9 | DMA-(MEA-co-tBA)-DMA | 41-46-41 | 0.70 | 539 | 8.8 |

TABLE 1-continued

| Example | Sequence | M$_n$ (kg/mol) | DMA fraction (mol) | E (MPa) | η (mPas) |
|---|---|---|---|---|---|
| 10 | DMA-(MEA-co-tBA)-DMA | 36-46-36 | 0.67 | 450 | 7.9 |
| 11 | DMA-(MEA-co-tBA)-DMA | 17-46-17 | 0.49 | 193 | 5.2 |
| 12 | DMA-(MEA-co-tBA)-DMA | 6-46-6 | 0.27 | <2 | 4.0 |
| 13 | DMA-(MEA-co-tBA)-DMA | 9-46-9 | 0.34 | <2 | 3.9 |
| 14 | DMA-(MEA-co-tBA)-DMA | 12-46-12 | 0.40 | 15 | 4.0 |
| 15 | DMA-(MEA-co-tBA)-DMA | 14-46-14 | 0.45 | 63 | 4.6 |
| 16 | DMA-(MEA-co-tBA)-DMA | 17-46-17 | 0.49 | 184 | 4.4 |
| 17 | DMA-(MEA-co-tBA)-DMA | 17-46-17 | 0.49 | 165 | 4.7 |
| 18 | DMA-(MEA-co-tBA)-DMA | 19-46-19 | 0.52 | 115 | 4.7 |
| 19 | DMA-(MEA-co-tBA)-DMA | 21-46-21 | 0.54 | 186 | 5.0 |
| 20 | DMA-(MEA-co-tBA)-DMA | 30-46-30 | 0.63 | 245 | 5.9 |
| 21 | DMA-(MEA-co-tBA)-DMA | 39-46-30 | 0.69 | 478 | 6.9 |

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

The invention claimed is:

1. A process for preparing a block copolymer characterized by the general formula (AB)$_n$-Core, or having the structure A-B-A, where A and B are polymeric blocks and Core is a non-polymeric linking core; wherein said block copolymer comprises at least one random block comprised of two or more monomers, wherein at least one of said two or more monomers is hydrophilic and at least one of said two or more monomers is hydrophobic such that an absolute difference in log p between said at least one hydrophobic and hydrophilic monomers is at least about 0.5; and n is 2 or more; and provided that said block copolymer is soluble or miscible in water or alcohol or a combination thereof at a concentration of at least about 20 mg/mL at room temperature, the process comprising polymerizing telechelic polymers of blocks A and B and attaching said telechelic polymers together with covalent bonds.

2. A process for preparing a block co-polymer characterized by the general formula (AB)$_n$-Core, or having the structure A-B-A, where A and B are polymeric blocks and Core is a non-polymeric linking core; wherein said block copolymer comprises at least one random block comprised of two or more monomers, wherein at least one of said two or more monomers is hydrophilic and at least one of said two or more monomers is hydrophobic such that an absolute difference in log p between said at least one hydrophobic and hydrophilic monomers is at least about 0.5; and n is 2 or more; and provided that said block copolymer is soluble or miscible in water or alcohol or a combination thereof at a concentration of at least about 20 mg/mL at room temperature, the process comprising: polymerizing block B in an un-controlled free radical polymerization process and growing said A blocks from said B blocks in a polymerization.

3. A process for preparing a block co-polymer characterized by the general formula $(AB)_n$-Core, or having the structure A-B-A, where A and B are polymeric blocks and Core is a non-polymeric linking core; wherein said block copolymer comprises at least one random block comprised of two or more monomers, wherein at least one of said two or more monomers is hydrophilic and at least one of said two or more monomers is hydrophobic such that an absolute difference in log p between said at least one hydrophobic and hydrophilic monomers is at least about 0.5; and n is 2 or more; and provided that said block copolymer is soluble or miscible in water or alcohol or a combination thereof at a concentration of at least about 20 mg/mL at room temperature, the process comprising:
(1) fanning a mixture of
(a) a multi-functional initiator, a multi-functional chain transfer agent or a multi-functional initiator-control agent adduct; and
(b) one or more monomers tat comprise the B block
(2) subjecting said mixture to polymerization conditions with living kinetics to form said B block; and
(3) adding one or more monomers to said polymerization mixture to form said A block.

4. The process of claim 2, wherein a multi-functional initiator-control agent adduct is present and is characterized by the formula:

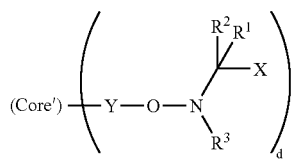

where Core' is a core molecule; d is 2 or more; Y is a residue capable of initiating a free radical polymerization upon homolytic cleavage of the Y—O bond, the residue being selected from the group consisting of fragments derived from a free radical initiator, alkyl, substituted alkyl, alkoxy, substituted alkoxy, aryl, substituted aryl, and combinations thereon X is a moiety that is capable of destabilizing the control agent on a polymerization time scale; and each $R^1$ and $R^2$, independently, is selected from the group consisting of alkyl, substituted alkyl, cycloalkyl, substituted cycloalkyl, heteroalkyl, heterocycloalkyl, substituted heterocycloalkyl, aryl, substituted aryl, heteroaryl, substituted heteroaryl, alkoxy, aryloxy, silyl, bowl, phosphino, amino, thio, seleno, and combinations thereof; and $R^3$ is selected from the group consisting of tertiary alkyl, substituted tertiary alkyl, aryl, substituted aryl, tertiary cycloalkyl, substituted tertiary cycloalkyl, tertiary heteroalkyl, tertiary heterocycloalkyl, substituted tertiary heterocycloalkyl, heteroaryl, substituted heteroaryl, alkoxy, aryloxy and silyl.

5. The process of claim 2, wherein a multi-functional chain transfer agent is present in said mixture wit an initiator and said multi-functional chain transfer agent is characterized by the general formula:

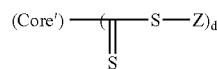

wherein Core' is a core molecule, S is sulfur, d is 2 or more, and Z is any group that activates the C═S double bond towards a reversible free radical addition fragmentation reaction.

6. A process for preparing a block copolymer characterized by the general formula $(AB)_n$-Core, where A and B are polymeric blocks and Core is a non-polymeric linking core; wherein said block copolymer comprises at least one random block comprised of two or more monomers, wherein at least one of said two or more monomers is hydrophilic and at least one of said two or more monomers is hydrophobic such that an absolute difference in log p between said at least one hydrophobic and hydrophilic monomers is at least about 0.5; and n is 2 or more; and provided that said block copolymer is soluble or miscible in water or alcohol or a combination thereof at a concentration of at least about 20 mg/mL at room temperature, comprising polymerizing an AB block by living free radical polymerization by virtue of a control agent bound to the B terminus, said control agent being allowed to react with a n-functional compound to Loin the desired block copolymers $(AB)_n$-Core.

7. The process of any of claims 1, 2, 3 or 6, wherein said random block is disposed between at least one of said A and B blocks.

8. The process of any of claims 1, 2, 3 or 6, wherein said linking core is a di-functional initiator-control agent adduct and n is 2, such that upon formation of said block copolymer there are two A blocks, one at each terminus end of said B block.

9. The process of claim 8, wherein said linking core is selected from the group consisting of 4-arm, 6-arm, 8-arm and 12-arm stars.

10. The process of any of claims 1, 2, 3 or 6, wherein said linking core is selected from the group consisting of 4-arm, 6-arm, 8-arm and 12-arm moieties.

11. The process of any of claims 1, 2, 3 or 6, wherein a ratio of said two or more monomers in said random block is chosen such that an increase in the proportion of said at least one hydrophobic monomer results in a decrease in the solubility or dispersability of the block copolymer in water, methanol, ethanol, isopropanol or a combination thereof.

12. The process of any of claims 1, 2, 3 or 6, wherein a ratio of said two or more monomers in said random block is chosen such that a decrease in the proportion of said at least one hydrophobic monomer results in an increase in the solubility or dispersability of the block copolymer in water, methanol, ethanol, isopropanol or a combination thereof.

13. The process of any of claims 1, 2, 3 or 6, wherein the A block is a polymeric block of monomer selected from the group consisting of methyl methacrylate and N,N-dimethylacrylamide.

14. The process of any of claims 1, 2, 3 or 6, wherein the B block is a polymeric block of (2-methoxyethyl)acrylate.

15. The process of any of claims 1, 2,3 or 6, wherein at least one of said two or more monomers is hydrophilic and at least one of said two or more monomers is hydrophobic such that an absolute difference in log p between said at least one hydrophobic and hydrophilic monomers is at least about 1.0.

16. The process of any of claims 1, 2, 3 or 6, wherein at least one of said two or more monomers is hydrophilic and at least one of said two or more monomers is hydrophobic such that an absolute difference in log p between said at least one hydrophobic and hydrophulie monomers is at least about 1.5.

* * * * *

UNITED STATES PATENT AND TRADEMARK OFFICE
CERTIFICATE OF CORRECTION

PATENT NO. : 7,067,586 B2  Page 1 of 1
APPLICATION NO. : 10/881421
DATED : June 27, 2006
INVENTOR(S) : Liu et al.

It is certified that error appears in the above-identified patent and that said Letters Patent is hereby corrected as shown below:

Col. 25, Line 16, replace "fanning" with --forming--

Col. 25, Line 20, replace "tat" with --that--

Col. 25, Line 42, replace "thereon" with --thereof;--

Col. 25, Line 48, replace "bowl" with --boryl--

Col. 25, Line 57, replace "wit" with --with--

Col. 26, Line 19, replace "Loin" with --form--

Col. 26, Line 20, replace "copolymers" with --copolymer--

Col. 26, Line 62, replace "hydrophulic" with --hydrophilic--

Signed and Sealed this

Third Day of October, 2006

JON W. DUDAS
*Director of the United States Patent and Trademark Office*